United States Patent [19]
Lammers et al.

[11] Patent Number: 5,264,971
[45] Date of Patent: Nov. 23, 1993

[54] TRANSMISSIVE DOPPLER FREQUENCY SHIFTER

[75] Inventors: Uve H. W. Lammers, Chelmsford; Richard A. Marr, N. Billerica, both of Mass.

[73] Assignee: The United States of America as represented by the Secretary of the Air Force, Washington, D.C.

[21] Appl. No.: 805,284

[22] Filed: Dec. 10, 1991

[51] Int. Cl.$^5$ ............................................. G11B 15/12
[52] U.S. Cl. ........................................ 360/63; 359/223; 359/226; 359/858
[58] Field of Search .................. 360/63; 359/223, 226, 359/858, 861

[56] References Cited

U.S. PATENT DOCUMENTS

| | | | |
|---|---|---|---|
| 4,264,141 | 4/1981 | Guers et al. | 350/486 |
| 4,418,989 | 12/1983 | McCulla et al. | 350/486 |
| 4,830,479 | 5/1989 | Lammers | 359/223 |
| 5,007,721 | 4/1991 | Morris et al. | 350/486 |

Primary Examiner—Donald T. Hajec
Assistant Examiner—Won Tae C. Kim
Attorney, Agent, or Firm—Irwin P. Garfinkle; Donald J. Singer

[57] ABSTRACT

The disclosed system comprises: 1) a transmissive frequency shifter based on reflection from rotating flat surfaces and from stationary involute surfaces; 2) system to compensate for effects of rotation rate instabilities and certain imperfections in the frequency shifter's reflection geometry, and a system to multiply the frequency shift obtainable by an integer number n through an n-fold re-use of stationary reflecting surfaces.

9 Claims, 6 Drawing Sheets

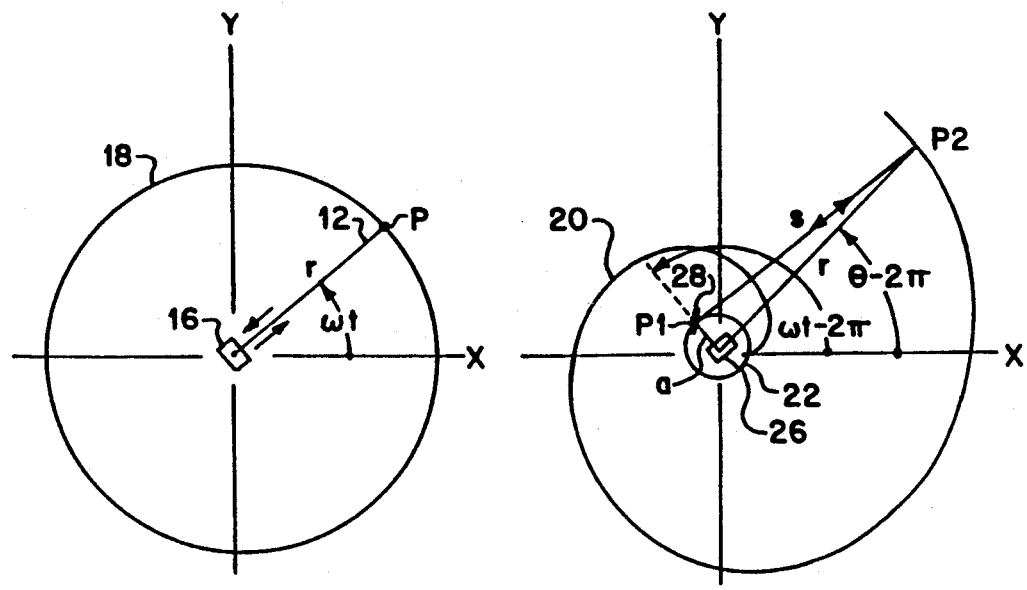
FIG. 1a
PRIOR ART
FIG. 1b
PRIOR ART
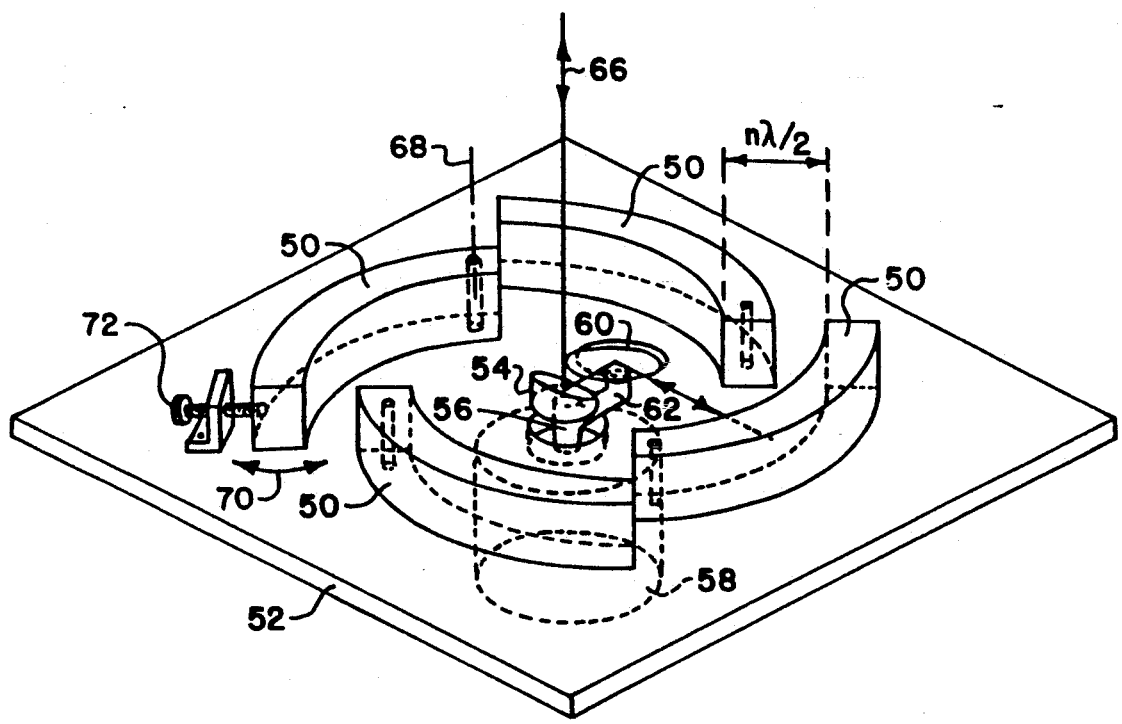
FIG. 1c
PRIOR ART 5,264,971

TRANSMISSIVE DOPPLER FREQUENCY SHIFTER

STATEMENT OF GOVERNMENT INTEREST

The invention described herein may be manufactured and used by or for the Government for governmental purposes without the payment of any royalty thereon.

BACKGROUND OF THE INVENTION

Highly correlated transmit and local oscillator signals for use in a narrowband heterodyne system at millimeter and submillimeter wavelengths can be derived from a single source. One component is Doppler shifted in frequency by a mechanically rotating frequency shifter before transmission. The other component is left unshifted for use as a local oscillator signal. Under the condition of only a small differential delay between transmit and local oscillator paths, most frequency and phase instabilities of the source are eliminated in the process of forming the difference or intermediate frequency. If the mechanical frequency shifter is reflective in nature, that is, if the frequency shifted beam exits on the same path as the unshifted beam enters, then it is difficult to separate the two beams completely and to prevent part of the frequency shifted transmit beam from returning to the receiver mixer via the source power-divider path. This may lead to a decrease in receiver sensitivity. This invention provides a transmissive frequency shifter, which propagates the incoming and exiting beams along different paths, thus avoiding leakage into the mixer and subsequent receiver desensitization.

THE PRIOR ART

The present invention is an improvement over our prior invention disclosed in U.S. Pat. No. 4,830,479. Whereas our prior invention provided a reflective system for Doppler shifting, the present invention provides a transmissive system. In addition, the present invention provides improvements in stability and accuracy.

A comprehensive description of our prior frequency shifter has been presented in a journal article by Lammers, Marr, and Morris entitled "A Coherent Mechanical Submillimeter Frequency Shifter". It was published in the International Journal of Infrared and Millimeter Waves, Vol. 11, No. 3, pp. 367-382, March 1990. A second article by the same authors published in the same journal entitled "Narrowband Heterodyne Reception Using Unstabilized Sources", Vol. 11, No. 6, pp. 701-716, 1990, outlines conceptually how such a device might be used in a practical measurement situation, and reports on the performance of a test system.

A mechanically rotating spiral frequency shifter is disclosed in Morris et al. U.S. Pat. No. 5,007,721. In the Morris et al. device, monochromatic frequency shifting is achieved by phase coherent sequencing of repetitive Doppler shifted wavetrains, reflected from rotating helically shaped surfaces and stationary flat surfaces. The device lends itself to both a reflective and transmissive mode of operation. In contrast, the Lammers et al. U.S. Pat. No. 4,830,479 depended on reflection from rotating flat surfaces and stationary involute surfaces for a reflective mode of operation only.

The present invention comprises:

1) a transmissive frequency shifter based on reflection from rotating flat surfaces and from stationary involute surfaces;

2) a method to compensate for effects of rotation rate instabilities and certain imperfections in the frequency shifter's reflection geometry, and 3) a method to multiply the frequency shift obtainable by an integer number n through an n-fold re-use of stationary reflecting surfaces.

OBJECTS OF THE INVENTION

It is an object of this invention to provide a rotating Doppler frequency system which is transmissive in operation so that the unshifted and frequency shifted signals are on different paths.

It is another object of this invention to provide a transmissive frequency shifter based on reflection from rotating flat surfaces and from stationary involute surfaces;

Still another object of this invention is to provide means for compensating for the effects of rotation rate instabilities and certain imperfections in the frequency shifter's reflection geometry, and Yet another object of this invention is to provide a method to multiply the frequency shift obtainable by an integer number n through an n-fold re-use of the stationary reflecting surfaces.

DESCRIPTION OF THE DRAWINGS

For a more complete understanding of the nature of this invention and for the further objects thereof, reference should now be made to the following specification and drawings in which:

FIGS. 1a, 1b and 1c depict the prior art as represented by our prior U.S. Pat. No. 4,830,479;

DESCRIPTION OF THE PRIOR ART

Figure 2:
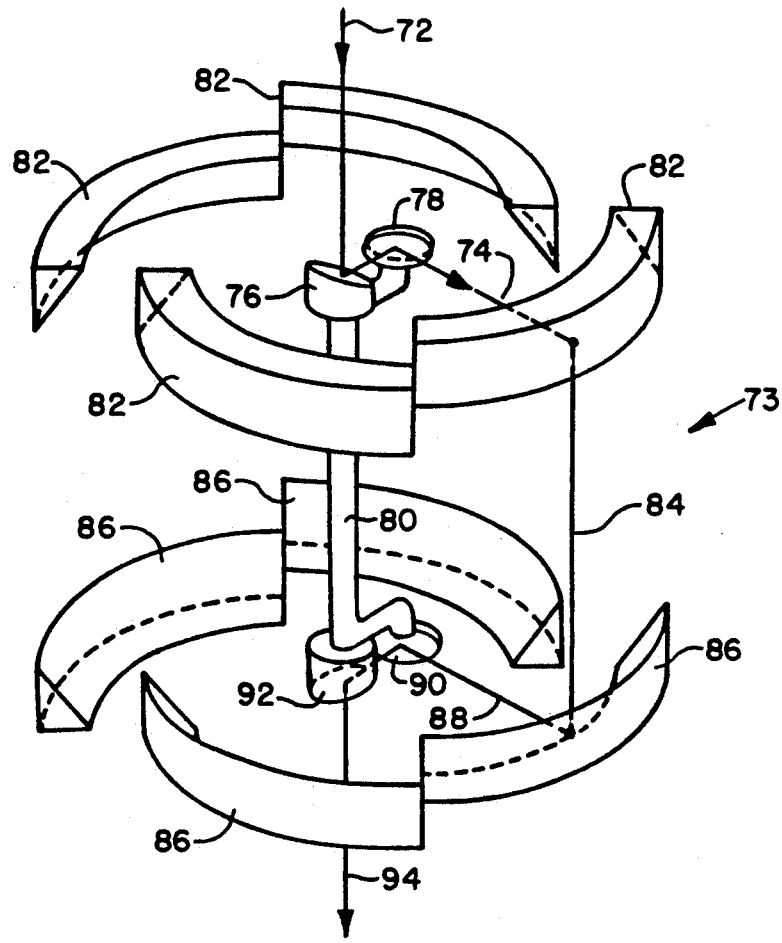
FIGS. 2-4 are schematic representations of one preferred embodiment of the present invention.

Before describing the preferred embodiment, reference is first made to FIGS. 1a, 1b and 1c which show our prior frequency shifter as disclosed in our U.S. Pat. No. 4,830,479. FIG. 1a depicts a ray 12 entering the paper plane perpendicularly along an axis Z orthogonal to axes X and Y. Ray 12 is deflected into the paper plane by a mirror 16 which is located at the origin and is oriented upwardly at a 45 degree angle from the paper plane. Mirror 16 rotates with an angular velocity $\omega$ around axis Z which is in line with the arriving ray 12. At the point P, ray 12 is reflected back on itself by the wall of a circular cylinder 18 of radius r and concentric with the axis Z. After that, ray 12 is retroreflected by mirror 16 along the path of its arrival. This assumes that the mirror 16 has turned insignificantly, while the ray 12 traverses the distance 2r. Although ray reversal has been achieved, no Doppler shift is realized because of the constant path length along the radius r.

In FIG. 1b, however, a reflecting surface is formed on the inner wall of a spiral member 20 whose spiral shape is the involute of a circle. Such a spiral may be formed, for example, by tracing the end of a taut string which is unwound from the circumference of a circle of radius a. Spiral member 20 has a polar equation:

$$\theta = \sqrt{(R/a)^2 - 1} - \tan^{-1}\sqrt{(R/a)^2 - 1} \qquad \text{(Eq 1)}$$

and has two important characteristics. Length s, which is the tangent to the circle 22 at point P1 and extends to point P2, is proportional to the rotational angle $\omega t$. It is also orthogonal to the spiral member 20 at point P2, independent of its angle $\omega t$. A ray striking at the center of mirror 26 which, like mirror 16 of FIG. 1a is positioned at the central axis Z and at a 45 degree angle from the paper plane, is reflected to point P1 on the mirror 28 and then to point P2 on the spiral member 20. Mirror 28 is perpendicular to the paper plane and made to rotate together with the mirror 26 at a distance "a" from the central axis Z. A ray striking the spiral member 20 is reflected on itself and leaves on the same path as it had entered.

If a spiral member covering 360 degrees of revolution is provided, as shown in FIG. 1b, and if the change of length s per complete revolution is an integer multiple of half the wavelength $\lambda/2$, assuming this is a reflective device, then the Doppler shift experienced by the signal is:

$$\Delta f = d/dt\, (2s/\lambda) = 2\omega a/\lambda \qquad \text{(Eq. 2)}$$

If the change of length s is not an integer multiple of half of a wavelength, the Doppler shifted signal will be phase modulated and spectrally broadened. It will be noted that r does not change linearly with $\omega t$, but s does. Also, that s is the instantaneous radius of curvature of spiral 20.

FIG. 1c is a perspective view of a preferred embodiment of our prior art patent. Instead of using one spiral member with one step of $\Delta s$ per 360 degrees of rotation, the embodiment of FIG. 1c uses four spiral members 50 mounted on is possible to use four members with $\Delta s/4$ per 90 degrees of rotation or any odd or even number of members, as long as each step is an integer multiple of $\lambda/2$. Each member has exactly the same spiral shape, an is not merely the succeeding portion of the same involute.

As seen in FIG. 1c, a first mirror 54 is attached to the shaft 56 of a motor 58 mounted below plate 52. Motor 58 spins mirror 54 at an angular speed $\omega$ about the central axis of the spiral members 50. A second mirror 60 is attached to the shaft 56 by side arm 62 which extends radially therefrom. Mirrors 54 and 60 are oriented in the same manner as the mirrors 26 and 28 of FIG. 1b. The reflective surfaces of the spiral members 50 have radial a separation of $n\lambda/2$ at their ends.

In the operation of the prior art FIG. 1c, an input signal ray 66 impinges on mirror 54 which together with mirror 60 is rotating at a speed $\omega$. Ray 66 is reflected by mirror 54 to mirror 60 and then to the reflective surface of a spiral member 50, Because of the particular curvature of the reflective surface of member 50, ray 66 is reflected back upon itself to retrace its path back to the source. As mirrors 54 and 60 rotate counterclockwise when viewed from the top, the distance the ray 66 must travel increases linearly until it reaches the end of member 50, where it abruptly decreases. This action is repeated as ray 66 traverses the next spiral member 50.

If the intersegment step is an exact multiple of half the wavelength $\lambda/2$, then this repetitive action produces the desired linear sweep and the resultant constant Doppler shift of the input ray 66. In order to make the frequency shifter useful over a range of wavelengths, members 50 are each mounted in such a way on plate 52 that they can be rotated around an axis 68 at one end thereof and perpendicularly thereto. At the other end of each member 50, a radial adjustment as shown by arrows 70 is achieved with a mechanical screw-type adjuster 72. For clarity of the drawing, only one of the spiral members 50 is shown having such a mechanical screw-type adjuster 1.

DESCRIPTION OF THE PREFERRED EMBODIMENTS

FIG. 2 shows in a schematic way the ray geometry of the basic transmissive frequency shifter, which is the subject of this invention. To avoid complicating the drawing, FIG. 2 shows only the ray path geometry.

In a manner similar to that described in connection with FIG. 1c, an incoming ray 72 coaxial with rotating shaft 80 is deflected into a tangentially rotating ray 74 by means of flat mirrors 76 and 78, attached to and rotating with shaft 80. Spiral stationary segments 82, involute contoured in the plane in which ray 74 moves, are sloped 45 degrees relative to ray 74 at every orientation that ray 74 takes. This causes the ray 74 to be deflected downward into ray 84. Ray 84 is thus orthogonal to ray 74 and parallel with ray 72. Ray 84 then impinges on one stationary involute segment 86, which is a mirror image of its companion segment 82.

Segments 82 and 86 are identical in number and arranged in two spaced planes orthogonal to shaft 80. They are a mirror image of each other not only in shape but in orientation. Ray 84 reflects at a right angle from the 45 degree slope of segment 86 and becomes ray 88, which is parallel with ray 74. A set of dual flat mirrors 90 and 92 mounted at the opposite end of shaft 80 returns ray 88 as ray 94, coaxial with and in the same direction as ray 72. Mirrors 90 and 92 are images of mirrors 78 and 76 in the same way as segments 86 are mirror images of segments 82.

Figure 3:
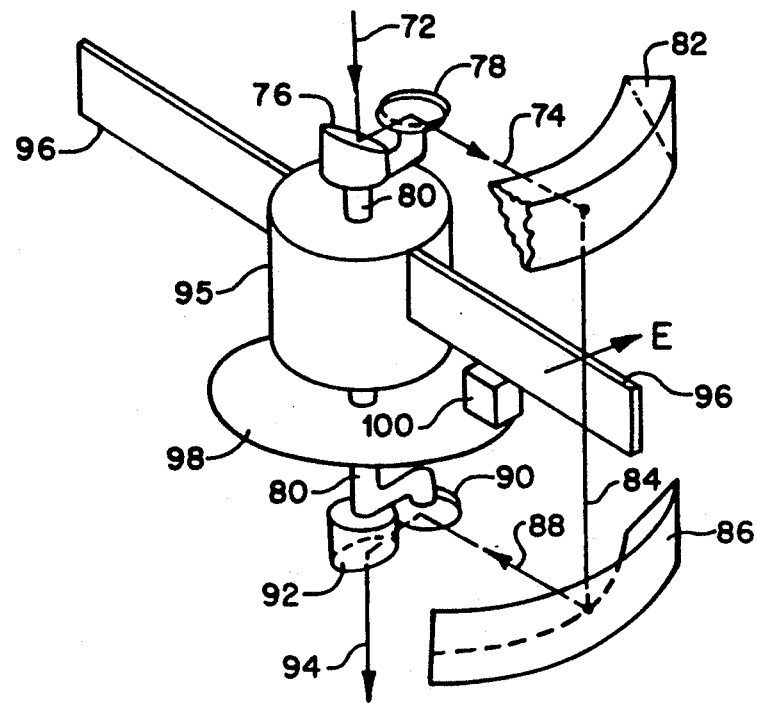

FIG. 3 shows certain details of the embodiment of FIG. 2 including a synchronous motor 95 attached to shaft 80, supports 96 for mounting the motor 95 to the stationary structure of the frequency shifter, and magnetic disc 98 and a magnetic read/write head 100 to derive a signal whose frequency is strictly in proportion with the angular velocity of the shaft 80.

Most of the stationary segments 82 and 86 have been omitted from FIG. 3 for clarity. It will be observed from this figure that ray 84 describes a continuous surface as shaft 80 completes a revolution, leaving no position where supports 96 do not intercept ray 84. This interception can be made to be nondetrimental, however, even with metallic supports 96, if these are made narrow in the direction parallel to the propagating E-field vector. It can be reasoned from FIG. 3 that a linearly polarized ray 72 will undergo a 720 degree rotation of polarization inside the frequency shifter as ray 84, once per revolution of shaft 80. It will emerge again as ray 94 with the same polarization as ray 72. At two rotational positions of shaft 80, 180 degrees apart, the condition of minimal interference between supports 96 and ray 84 are met. These positions depend on the polarization direction of the arriving ray 72.

The frequency shift of the device in FIG. 3 is directly proportional to the angular velocity of the rotating mirror assembly. Synchronous motor 95 is driven by a very stable frequency source not shown, however synchronous motors are known to have mechanical phase drift and oscillations, which result in a frequency or phase modulation of the frequency shifted signal. In order to cancel the effect of this modulation, the magnetic disk 98 is attached to the mirror assembly and rotates with shaft 80. A sinusoidal wavetrain is recorded on this disk, which is read by read/write head 100. The recording contains an integral number of periods and is chosen such that the frequency generated in the read/write head 100 is identical to the frequency shift imposed on ray 94. It will be shown later, how appropriate signal processing using these two signals can be used to make the performance of a system with the transmissive frequency shifter independent of the motor angular velocity changes.

Conceptually, disk 98 could also be optically reflective or transmissive at the same number of locations as there are magnetically recorded maxima in the wavetrain. This would then require an optical transmitter/receiver in place of read/write head 100 to derive the electrical signal directly proportional with the angular velocity of shaft 80. Three reasons make the magnetic recording technique preferable. 1) It is easier to obtain a sinusoidally varying waveform. 2) The recording can be changed more readily as the frequency of the incoming ray 72 is altered. 3) As will be shown later, imperfections in the stationary involute segments 82 and 86 can be partially compensated for through a properly recorded signal.

Figure 4:
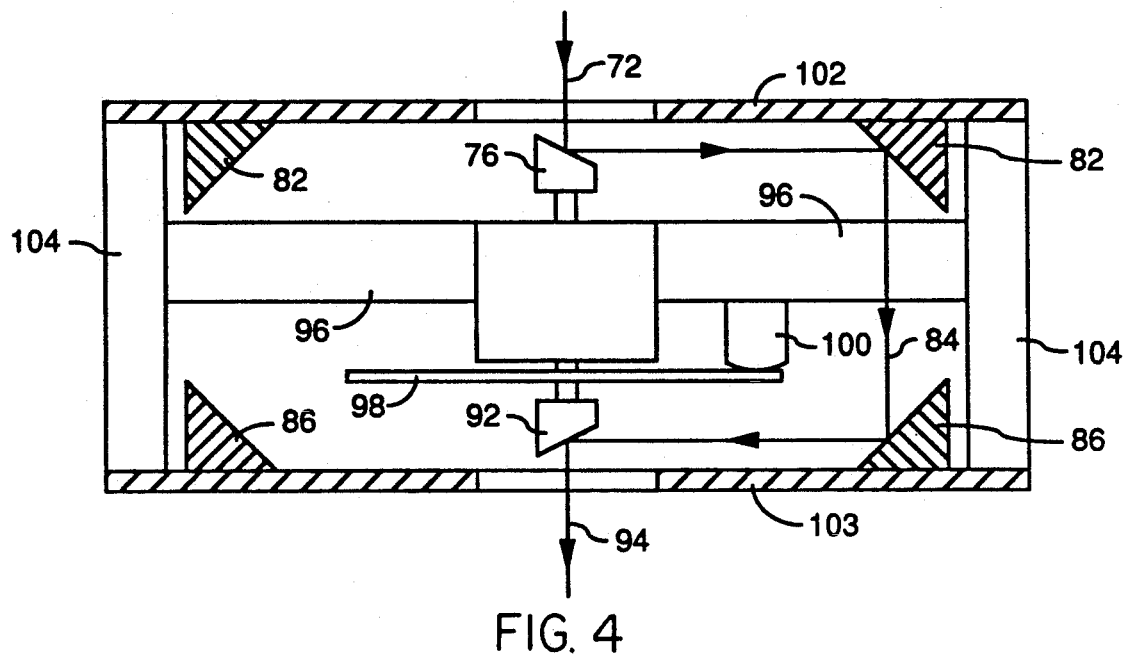

Whereas FIGS. 2 and 3 are perspective drawings of certain frequency shifter components without regard for how these are attached to each other, FIG. 4 is a sideview section showing how most of the shifter components are mounted. For simplicity it has been assumed in FIG. 4 that the ray paths 72, 84, and 94 lie in the paper plane, shortening the orthogonal connections between mirrors 76, 78 and mirrors 90, 92 to a single point. Mirrors 78 and 90 are therefore not shown in FIG. 4. Here two baseplates 102 and 103 with large center holes for ray entrance and exit are joined together by spacers 104. Involute segments 82 are mounted below the upper baseplate 102, while involute segments 86 are on top of the bottom baseplate 103. Motor supports 96 also connect to spacers 104. As mentioned, ray path 84 traverses supports 96 twice per rotation. Signal wires to and from magnetic read/write head 100 must follow support 96 to be of minimum ray obstruction.

Figure 5:
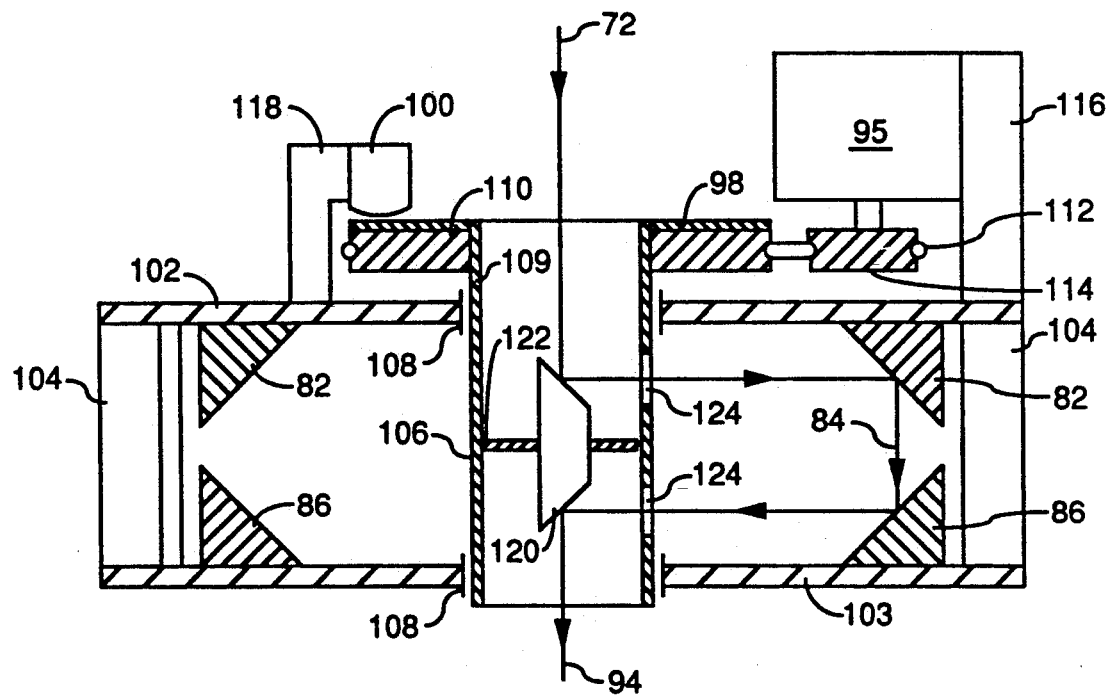
FIG. 5 is a modification of the invention which is provided to avoid ray path obstruction.

The design in FIG. 5 is similar to that of FIG. 4 but is modified so as to avoid ray path obstruction by mounting the rotating mirrors inside a circular tube 109, held to the top and bottom baseplates 102 and 103 by bearings 108. The tube 109 is rotated by a pulley 110, connected to a motor 95 via a belt 112 and another pulley 114. Motor 95 is held in position by support 116, which itself is mounted on the upper baseplate 102. The belt/pulley drive is by way of example only. Gears can be used instead, or pulley 114 can be a rubber friction wheel pressed against a smooth wheel instead of pulley 110. Also, wheel 110 might be a turbine wheel, propelled by an air stream directed against it. Wheel 110 carries the magnetic disk 98. Magnetic read/write head 100 is held close to disk 98 by support 118.

Internally, mirrors 76 and 92 of FIGS. 2, 3 and 4 are integrated with shaft 80 into a single unit 120 to which sidearm mirrors 78 and 90, (which, as in FIG. 4, are not shown) are attached. This whole assembly is held inside tube 109 by disk 122. Passage holes 124 in tube 109 let the ray pass unimpeded. Whereas the completely unimpeded ray path in this design may be of advantage, and also the ray path 84 may be of shortest length attainable, there are disadvantages. These include the added friction in bearings 107 and 108 and the need for an offset drive motor, unless a special design motor or a turbine is being used.

Figure 6:
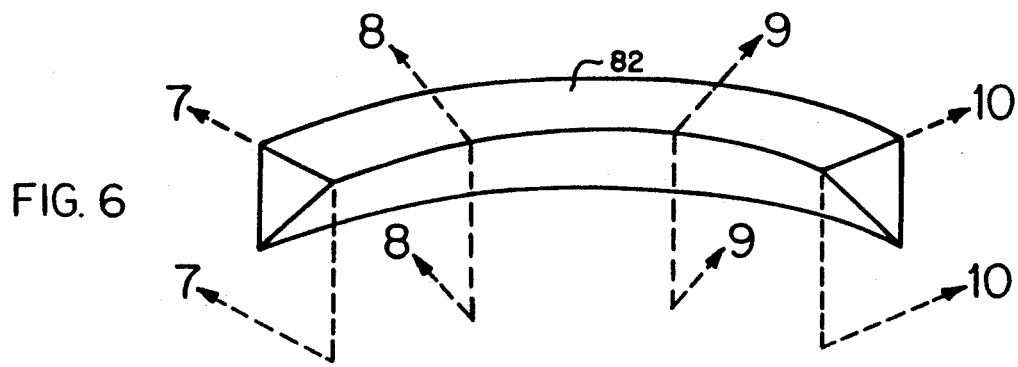
FIG. 6 shows a detail of the invention.
Figure 7:
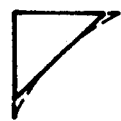
FIGS. 7, 8, 9 and 10 show sections taken through various positions of the detail of FIG. 6.
Figure 8:
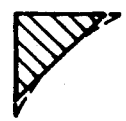
Figure 9:
Figure 10:
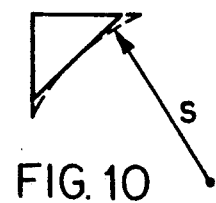

FIG. 6 shows an involute contoured segment 82. Cross sections at four locations in directions normal to the involute direction are indicated by arrows 7,7 through 10,10 and drawn in FIGS. 7 through 10. The basic cross section is that of a right isosceles triangle. The 45 degree inclination of the reflecting involute surface is optimal for reflection of the center ray 74 in FIG. 2. Considering an actual device with a diverging ray bundle (Gaussian beam), a curved reflecting surface as indicated in FIGS. 7 through 10 by the dashed outline might be advantageous. This curvature would help refocus an expanding beam of finite cross section. Curvature s as shown in FIG. 10 is chosen equal to the local involute curvature, thus preserving beam cross sectional symmetry to a first order.

Figure 11:
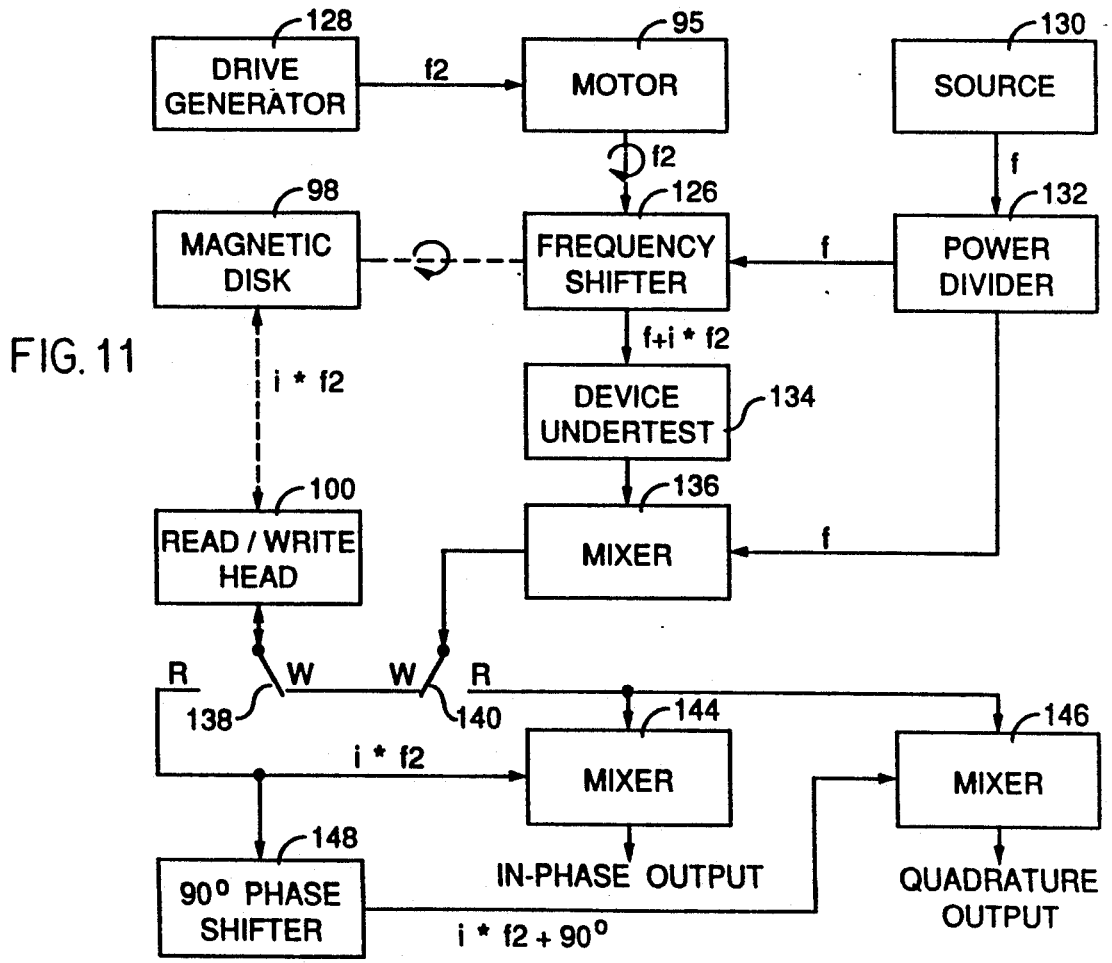
FIG. 11 is a block diagram showing the use of the frequency shifter in a system.

The block diagram of FIG. 11 describes in basic terms how the transmissive frequency shifter is employed in a millimeter or submillimeter system. The frequency shifter 126 is driven by a motor 95 at frequency $f2$, where $f2$ is generated by a drive generator 128. Frequency $f2$ need not be highly constant, nor does motor shaft 80 rotation have to be frequency or phase synchronous with drive signal $f2$ to produce optimum results with the FIG. 11 system. Magnetic disk 98 is rigidly attached to the rotating assembly of frequency shifter 126 and carries precise phase information on the frequency shifter's mechanical rate of rotation. Signal $f$ from a millimeter or submillimeter source 130 is divided in a power divider 132. One component is frequency shifted in the shifter 126 by an amount $i*f2$. Factor $i$ is an integer determined by $f$ and the mechanical dimensions of the frequency shifter. The frequency shifted signal $f+i*f2$ is transmitted through the device under test 134, which imposes on it frequency, phase, or amplitude changes as appropriate. The signal from the device under test then enters a first mixer 136. Its local oscillator signal is the other, unshifted component of the source signal $f$. The mixer outputs a first intermediate frequency signal $i*f2$.

One major advantage of frequency shifter 126 is due to its transmissive mode of operation. A frequency shifted signal arriving at mixer 136 must have passed through the device under test 134 and cannot have leaked around via the power divider 132, as is possible with a reflective frequency shifter. This affects the minimum signal from the device under test 134 that can be measured.

A dual set of single pole, double throw switches, 138 and 140, direct the output from the first mixer 136 to the read/write head 100 when in the "write" position "W". Amplification of this signal is necessary but not shown in FIG. 11. With no device under test connected in the "W" or write mode, a first intermediate frequency wavetrain is written to the magnetic disk 98. This wavetrain contains an integral number of periods. The number of periods is independent of the rotational frequency f2. It also contains a replica of involute contour or position imperfections and can be used later to compensate for such imperfections when an actual signal is being received from a device under test 134. That is, if the frequency shifter's output is modulated in phase or frequency due to deviations in the involute contour or position, this is recorded magnetically at the appropriate angular positions on the magnetic disk 98. With this information stored, the switches 138 and 140 are placed in the "R" or read positions, and the device under test 134 is inserted. The output from the first mixer 136 is now directed to two second mixers or in-phase and quadrature detectors 144 and 146. The local oscillator or reference signals are derived from the magnetic disk recording, read by read/write head 100. Mixer 144 is fed directly by this signal, mixer 146 is fed through a 90 degree phase shifter 148 to put the two local oscillator signals into phase quadrature. Generating these signals directly from the wavetrain recorded on the magnetic disk 98 results in a complete insensitivity of the second mixer outputs to motor frequency f2 changes. Also, effects of non-linear phase progression of the output shifter 126 due to involute reflection imperfections cancel in the second heterodyning process. Frequency and phase instabilities of the source 130 cancel in the first heterodyning process, assuming that only small differences in path delay accrue on the signal and local oscillator paths between power divider 132 and mixer 136. Thus, the frequency and phase stability of the measurement in FIG. 11 is largely independent of the frequency and phase stability of the two signal sources 128 and 130 involved and of the rigidity with which the frequency shifter's mechanical rotation follows the drive signal f2. In fact, as mentioned earlier, the shifter need not even be driven electrically.

One limitation of a mechanical frequency shifter as in FIGS. 1 or 2 is the amount of frequency shift df available, where $$df = 4 \pi r N / l.$$

Figure 12:
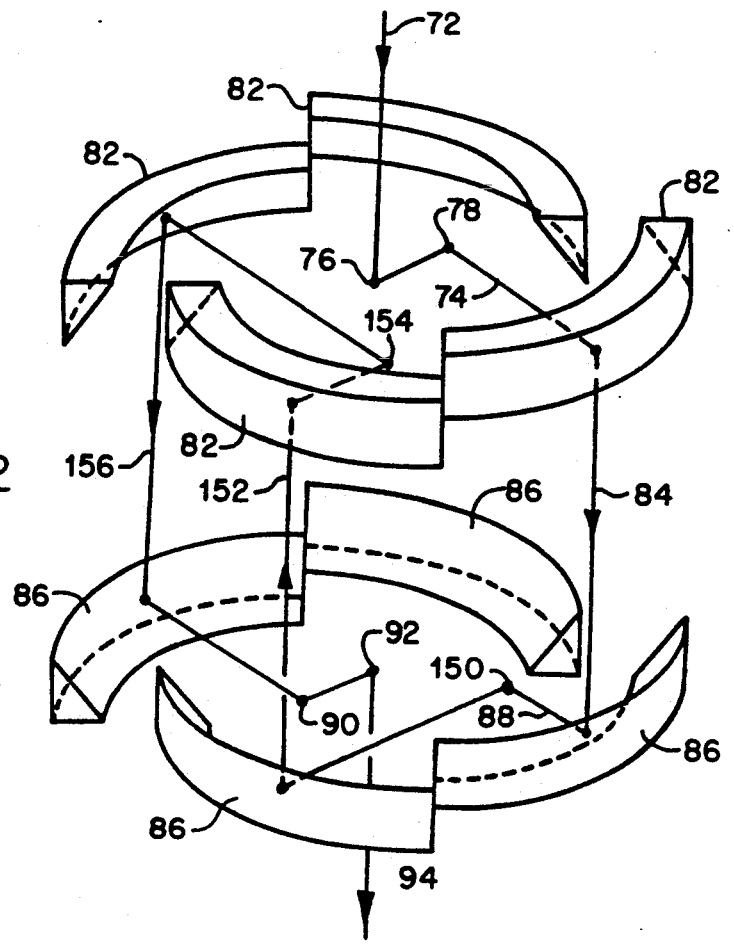
FIGS. 12 and 13 show a modification of the FIG. 2 arrangement whereby the length of the reflection path, and, therefore, the amount of Doppler shift is multiplied by a factor of 3.

Here r is the radius of the circle generating the involute contour, N is the number of turns per second of shaft 80, and 1 is the wavelength. For example, with r=19.04 mm, N=400 Hz, and 1=0.471 mm we achieve df=203.2 kHz, which is low compared to intermediate frequencies of the order of 1 GHz, typical of submillimeter heterodyne systems. The reflective frequency shifter of FIG. 1 can be equipped with a third rotating mirror as shown in the Lammers and Marr patent cited, such that the frequency shift doubles by twice reflecting off the involute segments. The transmissive frequency shifter, by virtue of its design, makes possible n-fold re-use of the internal reflection path, thereby increasing the frequency shift df by a factor n. In order to retain the transmissive nature of the frequency shifter, only odd numbers are valid for n. In the basic configuration of the device in FIG. 2, n=1. That is, the ray transmits between the upper and lower halves of the device only once. Suppose, though, that a mirror closer toward segment 86 but of the same inclination as mirror 90 intercepted ray 88 and deflected it orthogonally against another segment 86. This is seen in FIG. 12, which shows only segments 82 and 86, the flat rotating mirrors as numbered dots, and the ray path. All ray reflections are orthogonal. All reflecting surfaces are at 45 deg angles with respect to the arriving and departing rays. Ray propagation in FIG. 12 is the same as in FIG. 2 up to the point where ray 88 is deflected by mirror 150 onto the adjacent segment 86. Here it reflects upward as ray 152 and inward toward mirror 154 by adjacent segment 82. Reflection from mirror 154 starts the same process over again, with the ray reflecting from the next adjacent segment 82 downward as ray 156. Ray 156 reflects from the third adjacent segment 86 and then is redirected by mirrors 90 and 92 into ray 94 as before, except that mirrors 90 and 92 had to be rotated 180 deg from their position in FIG. 2.

Figure 13:
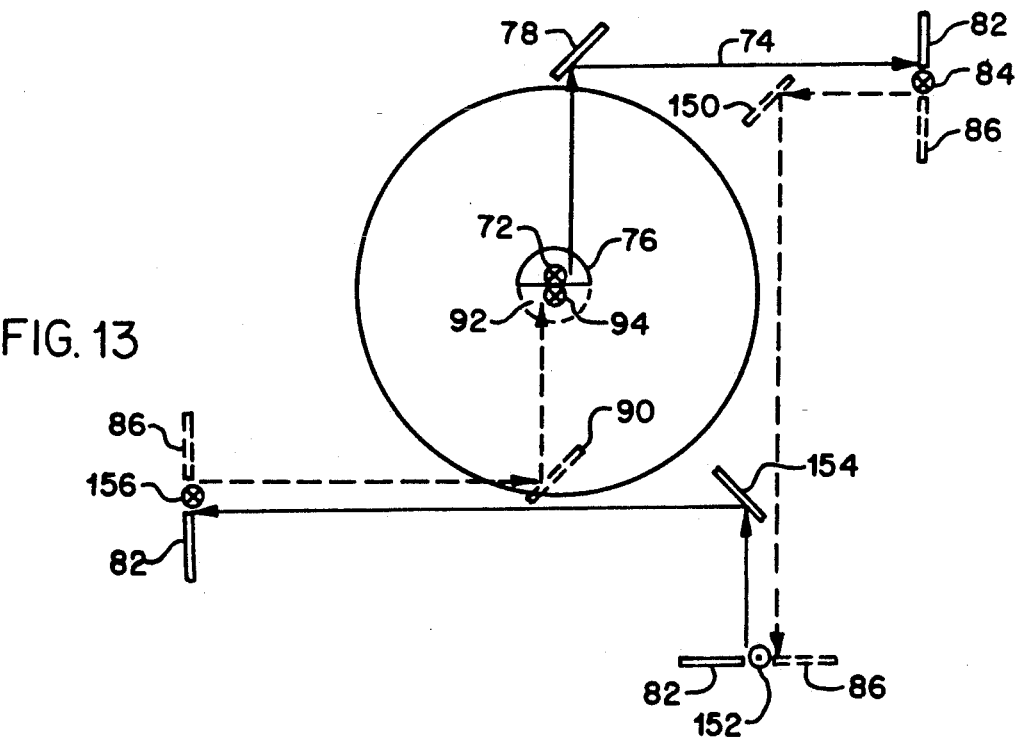
Figure 14:
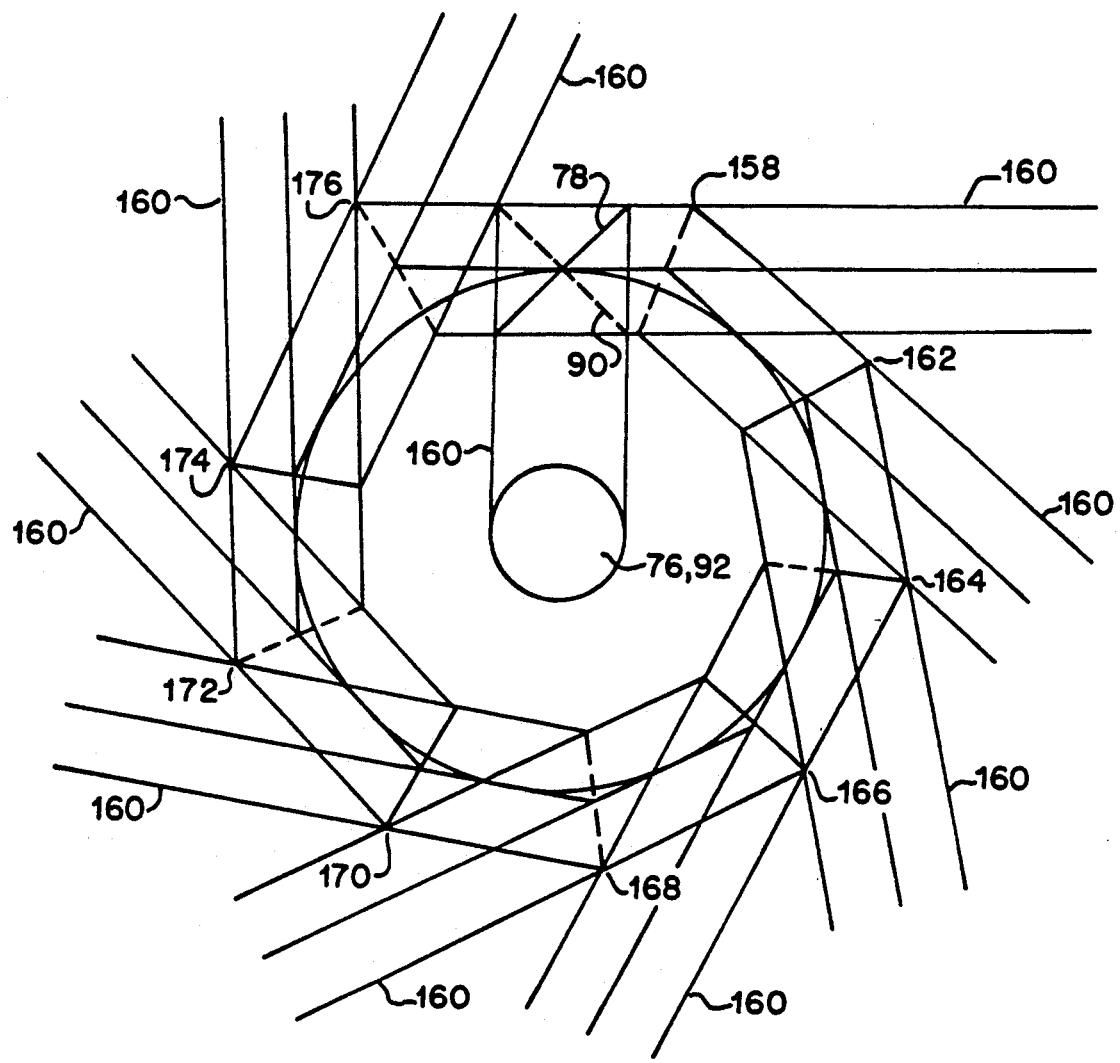
FIG. 14 shows a modification of the FIG. 2 arrangement whereby the length of the reflection path, and, therefore, the amount of Doppler shift is multiplied by a factor of 9.

A plan position view of the same ray geometry as in FIG. 12 can be seen in FIG. 13. The viewing direction is along ray 72. Mirrors, rays, and segments in the upper half of the device are drawn with solid lines. Mirrors, rays, and segments in the lower half are drawn with dashed lines. Some mirrors, rays, and segments, which actually project on top of each other are drawn partially or offset sideways for the sake of clarity. The case shown in FIGS. 12 and 13 is for n=3. It should be obvious how to interpret FIG. 13 from a knowledge of the ray geometry in FIG. 12. From FIG. 13 one can expand to a ray geometry for higher numbers n. There is an upper limit on n depending on the thickness of the ray bundle or width of the Gaussian beam that has to be accommodated. As an example, the case for n=9 is drawn in FIG. 14. Mirrors 150 and 154 in FIG. 13 intercepted the rays returning from segments 86 and 82, respectively, at a 45 deg angle, leading to identical ray 84, 152 and 156 locations on three adjacent segments. Such symmetry may not be achievable for higher n and is not necessary. The plan view projection of the system of flat rotating mirrors for n=9 has been further simplified in FIG. 14. Ray bundle width is shown in addition to the center ray to demonstrate that unintentional interference of rays with mirrors limits n. FIG. 14 achieves the maximum number of segment reflections for the rotating mirror geometry and ray bundle width given. Ray bundle 160 enters centrally from above the paper plane, and is deflected by mirrors 76 and 78 toward a first reflection from segments 82 and 86 (not shown). All mirrors in the upper plane are drawn as solid lines, all mirrors in the lower plane, except mirror 92 which is hidden by mirror 76, are drawn in dashed lines. The beam, after reflecting from upper segment 82 and lower segment 86 is deflected by mirror 158 toward segment 86, then toward segment 82 and then toward mirror 162. The process repeats nine times until upon final reflection from segment 86 in the lower plane, the ray bundle 160 intercepts mirrors 176, 90 and 92 before it exits centrally downward from the paper plane. Note that mirrors 174 and 176 are positioned within the array so as to guarantee that ray bundle 160 returning to mirror 176 will clear mirror 90. Defocussing of ray bundles has been neglected in this description but may actually be another factor limiting n. The involute contours have focussing properties, counteracting the tendency of the ray bundle to diverge. If necessary, all flat mirrors can be shaped to converge the ray bundle further.

Many variations and adaptations will be apparent to persons skilled in the art. It is intended, therefore, that this invention be limited only by the appended claims as interpreted in the light of the prior art.

What is claimed is:

1. In a system for transmitting a beam of radiated energy having a given frequency and for Doppler shifting the frequency of said beam of radiated energy, the combination comprising:

a shaft rotating on its axis;

means for radiating said beam in an initial direction along a path coaxial with said axis;

frequency shifter means for Doppler shifting the frequency of said beam comprising first and second sets of reflectors, said first and second sets of reflectors being axially spaced from one another along said axis, and being arranged around said axis in first and second planes orthogonal to said axis;

said first set of reflectors comprising a first planar mirror affixed centrally on said axis to one end of said rotating shaft, the plane of said first planar mirror being at an angle of forty-five degrees with respect to said axis, a first radially spaced planar mirror affixed to said shaft at a distance r from said axis and at an angle of 45 degrees with respect to a radial line from said first planar mirror and parallel to said axis, and a first spiral mirror, said first spiral mirror having a reflecting surface which is at an angle of 45 degrees with respect to said first orthogonal plane, said first spiral mirror being radially spaced from and encircling said planar mirrors, said spiral mirror being the involute of a circle having a radius r and coaxial with said shaft;

said second set of reflectors comprising a second planar mirror affixed centrally on said axis to the other end of said rotating shaft, the plane of said second planar mirror being at an angle of forty-five degrees with respect to said axis, a second radially spaced planar mirror affixed to said shaft at a distance r from said axis, and at an angle of 45 degrees with respect to a radial line from said second planar mirror and parallel to said axis, and a second spiral mirror, said second spiral mirror having a reflecting surface which is at an angle of forty-five degrees with respect to said second orthongonal plane, said second spiral mirror being radially spaced from and encircling said second planar mirrors, said spiral mirror being the involute of a circle having a radius r and coaxial with said shaft;

each of the mirrors in said first and second sets being oriented so that said beam transmitted in said initial direction is reflected:

1. radially by said first planar mirror to said first radially spaced planar mirror, then
2. on a tangent to said circle by said first radially spaced planar mirror to said first spiral mirror, then
3. parallel to said axis from said first spiral mirror to said second spiral mirror, then
4. on a tangent to said circle from said second spiral mirror said second radially spaced planar mirror, and then
5. radially from said second radially spaced planar mirror to said second planar mirror, and then
6. axially from said second planar mirror in said initial direction;

whereby the length of the path of travel of said beam varies as said beam travels circumferentially around said first and second spiral mirrors, and whereby the direction of travel of said beam as it is reflected from said second planar mirror is in said initial direction.

2. The system of claim 1, wherein each of said first and second spiral mirrors comprises a plurality of identical segments, and wherein said beam traverses each of said segments as said planar mirrors are rotated.

3. The system of claim 2 wherein each of said first and second sets of reflectors includes an intermediate planar mirrors in said orthogonal planes, each of said intermediate mirrors being positioned on a line tangent to said circle, and intercepting a beam from a spiral segment, and reflecting said intercepted beam to a segment in its respective orthogonal plane, and then axially to a segment in the other set, whereby the number of the axial beam paths is multiplied.

4. The system of claim 3 wherein there is a plurality of intermediate mirrors, and the number of intermediate mirrors is equal to $(N-1)/2$, where N is and odd number and equals the number of axial beam paths between the orthogonal planes.

5. The system of claim 4, wherein certain of said mirrors are concave to confine said beam.

6. The system of claim 1, and
a first mixer, the doppler shifted output from said frequency shifter means being applied to a first input of said mixer, said radiated beam of energy being applied to a second input of said mixer;
a magnetic disc mounted on the axis of said shaft and rotatable therewith;
a stationary magnetic read/write head for recording and playing back recorded data on said disc;
a second mixer;
first switch means for selectively connecting the output of the first mixer to said head for recording said mixer output on said disc or to a first input of said second mixer; and
second switch means for connecting the output of said read/write head to a second input of said second mixer, the output of said second mixer having a frequency substantially unaffected by fluctuations in motor speed.

7. In a system for transmitting a beam of radiated energy having a given frequency and for Doppler shifting the frequency of said beam of radiated energy, the combination comprising:

a shaft;
a motor rotating said shaft on its axis;
a source of radiant energy, said source having a given frequency, the output of said source being applied to a power divider, said power divider having first and second outputs at said given frequency;
means for radiating a beam from the first output of said divider in an initial direction along a path coaxial with said axis;
frequency shifter means for Doppler shifting the frequency of said beam comprising first and second sets of reflectors, said first and second sets of reflectors being axially spaced from one another on said axis in first and second planes orthogonal to said axis;
said first set of reflectors comprising planar mirrors affixed on said axis to one end of said rotating shaft, said planar mirror being oriented to reflect said beam in a direction tangent to a circle of radius r, said circle being coaxial with said shaft; and a first spiral mirror, said first spiral mirror being the involute of a circle having a radius r, and having a reflecting surface which is at an angle of forty-five degrees with respect to said an incident beam, said first spiral mirror being radially spaced from and encircling said planar mirrors;

said second set of reflectors comprising second planar mirrors affixed on said axis to the other end of said rotating shaft, said second planar mirrors being oriented to reflect said beam on a tangent to a circle coaxial with said shaft and having a radius r, and a second spiral mirror, said second spiral mirror being the involute of a circle having a radius r, and having a reflecting surface which is at an angle of forty-five degrees with respect to an incident beam, said second spiral mirror being radially spaced from and encircling said second planar mirrors;

each mirror in said first and second sets being oriented so that said beam transmitted in said initial direction is reflected;
  1. radially by said planar mirrors to said first spiral mirror, then
  2. parallel to said axis from said first spiral mirror to said second spiral mirror, then
  3. radially from said second spiral mirror to said second planar mirrors, and then
  4. axially from said second planar mirror in said initial direction;

whereby the length of the path of travel of said beam varies as said beam travels circumferentially around said spiral mirrors, and whereby the direction of travel of said beam as it is reflected from said second planar mirror is in said initial direction, and whereby said frequency is Doppler shifted to f2.

8. The system of claim 7, wherein said first and second spiral mirrors comprise a plurality of identical segments, and wherein said beam successively traverses each of said segments as said planar mirrors are rotated.

9. The system of claim 8, and
a first mixer, the output from said frequency shifter means being applied to a first input of said mixer, the output from said power divider being applied to a second input of said mixer;
a magnetic disc mounted on the axis of said shaft and rotatable therewith;
a stationary magnetic read/write head for recording and playing back recorded data on said disc;
a second mixer;
first switch means for selectively connecting the output of the first mixer to said head for recording said mixer output on said disc or to a first input of said second mixer; and
second switch means for connecting the output of said read/write head to a second input of said second mixer, the output of said second mixer having a frequency, phase and amplitude substantially unaffected by fluctuations in motor speed.

* * * * *